(12) United States Patent
Harada et al.

(10) Patent No.: US 11,855,664 B2
(45) Date of Patent: Dec. 26, 2023

(54) SIGNAL RECEIVER INCLUDING DIGITAL IMAGE SIGNAL SEPARATION

(71) Applicant: Keysight Technologies, Inc., Santa Rosa, CA (US)

(72) Inventors: Koji Harada, Kobe (JP); Daiki Maehara, Kobe (JP)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 214 days.

(21) Appl. No.: 17/119,461

(22) Filed: Dec. 11, 2020

(65) Prior Publication Data
US 2022/0069852 A1 Mar. 3, 2022

Related U.S. Application Data

(60) Provisional application No. 63/071,548, filed on Aug. 28, 2020.

(51) Int. Cl.
*H04B 1/00* (2006.01)
*H04B 1/30* (2006.01)

(52) U.S. Cl.
CPC ............ *H04B 1/0092* (2013.01); *H04B 1/30* (2013.01)

(58) Field of Classification Search
CPC ................................. H04B 1/0092; H04B 1/30
See application file for complete search history.

(56) References Cited

U.S. PATENT DOCUMENTS

| | | |
|---|---|---|
| 5,678,222 A | 10/1997 | Hornak et al. |
| 6,690,735 B1 | 2/2004 | Maddiotto et al. |
| 10,181,916 B1 | 1/2019 | Modi et al. |

OTHER PUBLICATIONS

Issac Server; "Adaptive Calibration Methods for an Image-Reject Mixer," Electronics Research Laboratory, College of Engineering, University of California, Berkeley, Memorandum No. UCB/ERL M0I/36, Dec. 18, 2001, online <http://www2.eecs.berkeley.edu/Pubs/TechRpts/2001/ERL-01-36.pdf> (Year: 2001).*

(Continued)

*Primary Examiner* — Nader Bolourchi (57) ABSTRACT

A method of frequency-converting a received radio frequency (RF) signal includes frequency mixing a received RF signal with a first local oscillator (LO) signal to generate a first intermediate frequency (IF) signal, where the first IF signal is a mixed signal of a desired signal and an image signal. The method further includes frequency mixing the RF signal with a second LO signal to generate a second IF signal, where the second LO signal has a same frequency as the first LO signal, and the second LO signal has a 90 degree phase shift relative to the first LO signal. The method further includes analog-to-digital converting the first IF signal to a first digital signal and the second IF signal to a second digital signal, down-converting the first digital signal to a first digital baseband signal and the second digital signal to a second digital baseband signal, calibrating the first and second digital baseband signals for the 90 degree phase shift, and the separating the calibrated first and second digital baseband signals to obtain the desired signal and the image signal.

11 Claims, 9 Drawing Sheets

(56) References Cited

OTHER PUBLICATIONS

Jeffery Chow; "RF Image-Reject Receivers," University of Toronto, ECE 1352F, 2002, Online: https://www.eecg.utoronto.ca/~kphang/papers/2002/jchow_imagereject.pdf (Year: 2002).*

He Weidong et al., "An anti-image interference quadrature IF architecture for satellite receivers," Chinese Journal of Aeronautics, (2014),27(4), pp. 955-963.

D. Selwyn et al., "A K-band (30 GHz) image rejection mixer, " IEE Colloquium on Microwave Components in Telecommunications, May 1988, pp. 9/1-9/6.

Stephen A. Maas, "7.3.5 Image-Rejection Mixers", Artech House USA : Microwave Mixers, Second Edition, 1993, pp. 280-283.

\* cited by examiner

SIGNAL RECEIVER INCLUDING DIGITAL IMAGE SIGNAL SEPARATION

BACKGROUND

Superheterodyne receivers utilize a frequency mixer driven by a local oscillator (LO) to convert an incoming radio frequency (RF) signal to a lower frequency intermediate frequency (IF) signal. The image response of such receivers is an interfering response that is caused by the fact that, given the LO signal frequency, a mixer has sensitivity to two different input frequencies that result in the same output frequency. In other words, when observing a signal at the output of the mixer, there is uncertainty as to the input signal frequency since there are two possibilities. So-called image rejection is needed to resolve the uncertainty.

Generally speaking, image rejection relates to the filtering of responses resulting from RF signals at a frequency offset from the desired RF carrier frequency by an amount equal to twice the IF of superheterodyne receiver. For example, if the desired RF signal is at 100 megahertz (MHz), and the receiver IF is 4 MHz, then the receiver LO could be tuned to 96 MHz. However, as is well known to those skilled in the art, the receiver will also exhibit a response to undesired RF signals (referred to as image signals) at a frequency 4 MHz below the LO frequency, in this case, 92 MHz. The receiver's response to the 92 MHz signal is referred to as the image response, because the image signal resides at a frequency opposite the LO frequency from the desired RF carrier, and offset from the LO frequency by the magnitude of the IF. A similar image signal appears to the high frequency side when the LO frequency is greater than the desired RF carrier and the image frequency is larger than the LO frequency. Image rejection is achieved by passing only one signal and attenuating the other using a variable-frequency, wideband bandpass filter. However, such implementations are often unable to meet the requirements of modern wideband communication, radar and satellite systems. For example, the YIG (yttrium iron garnet) resonator is commonly employed to cover a large frequency range, but the signal bandwidth is far smaller than that required by modern systems. In addition, the YIG based bandpass filter is very costly and, because of design difficulty, is unable to keep up with ever-changing wideband requirements of current complex systems.

SUMMARY

According to an aspect of the inventive concepts, a method of frequency-converting a received radio frequency (RF) signal is provided. The method includes frequency mixing a received RF signal with a first local oscillator (LO) signal to generate a first intermediate frequency (IF) signal, where the first IF signal is a mixed signal of a desired signal and an image signal. The method further includes frequency mixing the RF signal with a second LO signal to generate a second IF signal, where the second LO signal has a same frequency as the first LO signal, and the second LO signal has a 90 degree phase shift relative to the first LO signal. The method further includes analog-to-digital converting the first IF signal to a first digital signal and the second IF signal to a second digital signal, down-converting the first digital signal to a first digital baseband signal and the second digital signal to a second digital baseband signal, calibrating the first and second digital baseband signals for the 90 degree phase shift, and the separating the calibrated first and second digital baseband signals to obtain the desired signal and the image signal.

According to another aspect of the inventive concepts, a radio frequency (RF) signal receiver is provided that includes a first mixer configured to mix a received RF signal and a first local oscillator (LO) signal to generate a first intermediate frequency (IF) signal, where the first IF signal is a mixed signal of a desired signal and an image signal. The RF signal receiver further includes a second mixer configured to mix the radio frequency (RF) signal and a second local oscillator (LO) signal to generate a second intermediate frequency (IF) signal, where the second LO signal has a same frequency as the first LO signal, and the second LO signal has a 90 degree phase shift relative to the first LO signal. The RF signal receiver further includes a first analog-to-digital converter (ADC) configured to convert the first IF signal to a first digital signal, a second analog-to-digital converter (ADC) configured to convert the second IF signal to a second digital signal, and a digital signal processor (DSP) configured to down-convert the first digital signal to a first digital baseband signal and the second digital signal to a second digital baseband signal, to calibrate the first and second digital baseband signals for the 90 degree phase shift, and to separate the first and second baseband signals to obtain the desired signal and the image signal.

According to another aspect of the inventive concepts, a radio frequency (RF) signal receiver is provided that includes a mixer configured during a first time-interleaved interval to mix a radio frequency (RF) signal and a first local oscillator (LO) signal to generate a first time-interleaved intermediate frequency (IF) signal, where the first IF signal is a mixed signal of a desired signal and an image signal. The mixer is further configured during a second time interleave interval to mix the RF signal and a second local LO signal to generate a second time-interleaved intermediate frequency (IF) signal, where the second LO signal has a same frequency as the first LO signal, and the second LO signal has a 90 degree phase shift relative to the first LO signal. The RF signal receiver further includes an analog-to-digital converter (ADC) configured to convert the first time-interleaved IF signal to a first time-interleaved digital signal, and to convert the second time-interleaved IF signal to a second time-interleaved digital signal. The RF signal receiver further includes a digital signal processor (DSP) configured to down-convert the first time-interleaved digital signal to a first time-interleaved baseband signal and the second time-interleaved digital signal to a second time-interleaved baseband signal, to calibrate the first and second time-interleaved digital baseband signals for the 90 degree phase shift, and to separate the calibrated first and second time-interleaved baseband signals to obtain the desired signal and image signals.

BRIEF DESCRIPTION OF THE DRAWINGS

The above and other aspects and features of the inventive concepts will become readily apparent from the detailed description that follows, with reference to the accompanying drawings, in which.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As will be described below, embodiments of the inventive concept present an image separation scheme that works in the digital domain. The embodiments offer flexibility to achieve a wide frequency range, a wide bandwidth, excellent image rejection performance, and a wide dynamic range. In addition, calibration efforts can be minimized.

Figure 1:
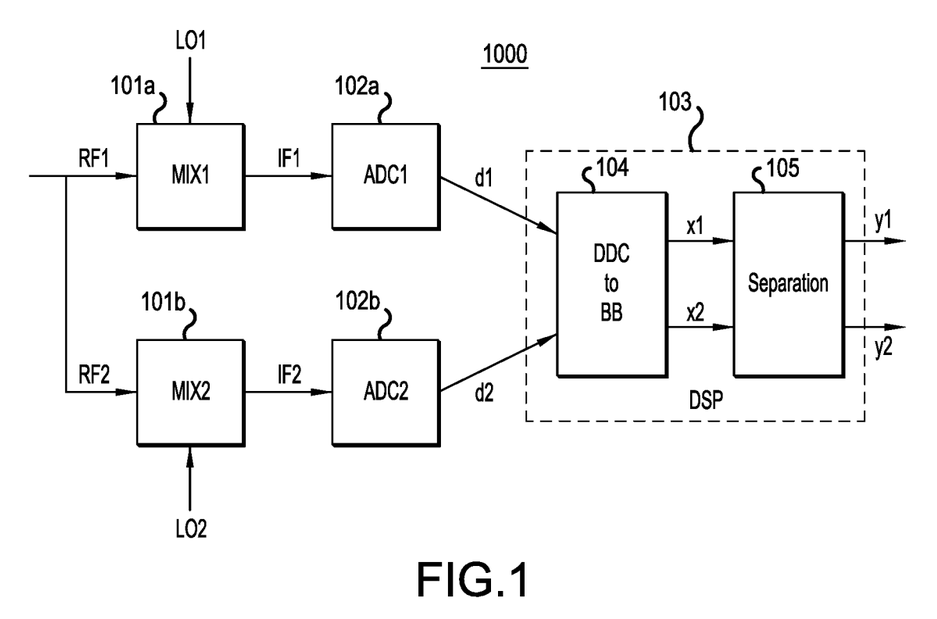
FIG. 1 is a circuit block diagram of a radio frequency (RF) receiver according to an embodiment of the inventive concepts.

FIG. 1 is a block circuit diagram of a radio frequency (RF) signal receiver according to an embodiment of the inventive concepts.

As shown, the RF signal receiver 1000 of this example is a two-channel configuration including a first frequency mixer (MIX1) 101a, a second frequency mixer (MIX2) 101b, a first analog-to-digital converter (ADC1) 102a, a second analog-to-digital converter (ADC2) 102b, and at least one digital signal processor (DSP) 103. The DSP 103 of this example includes a digital down conversion (DDC) to baseband (BB) module 104 and a separation module 105.

In operation, an input radio frequency (RF) signal is applied to the first and second frequency mixers 101a and 101b. The first frequency mixer 101a mixes the input RF signal and a first local oscillator (LO1) signal to down-convert the input RF signal to a first intermediate frequency (IF1) signal, and the second frequency mixer 101b mixes the input RF signal and a second local oscillator (LO2) signal to down-convert the input RF signal to a second intermediate frequency (IF2) signal. In the example of the current embodiment, a frequency of the LO1 signal is the same as a frequency of the LO2 signal, while a phase of the LO1 signal is spaced apart 90 degrees relative to the phase of the LO2 signal. As one example, the LO1 signal may be a cosine wave (cos( )) and the LO2 signal may be a corresponding negative sine wave (−sin( )) of the same frequency.

The first intermediate frequency (IF1) is sampled and converted to a digital IF1 signal d1 by the first analog-to-digital converter (ADC1) 102a. Likewise, the second intermediate frequency (IF2) is sampled and converted to a digital IF2 signal d2 by the second analog-to-digital converter (ADC2) 102b. Here, the remainder of the operation may take place in the digital domain.

The DDC to BB module 104 of the digital signal processor (DSP) 103 digitally down-converts the digital IF1 signal d1 to a corresponding digital baseband (BB) signal x1. Further, the DDC to BB module 104 of the digital signal processor (DSP) 103 digitally down-converts the digital IF2 signal d2 to a corresponding digital baseband (BB) signal x2. Here, the digital down-conversion (DCC) processes of the DDC to BB module 104 may be ideally characterized as follows:

$$x1 = \exp(-j2\pi f_{IF} t_n) d1$$

$$x2 = \exp(-j2\pi f_{IF} t_n) d2$$

In the equation expressed above, $f_{IF}$ denotes the intermediate frequency, and $t_n$ denotes a sampling period or interval.

The separation module 105 of the digital signal processor (DSP) 103 then generates separate desired (y1) and image (y2) signals by digitally processing the baseband signals x1 and x2. Here, the separation processes of the separation module 105 may be ideally characterized as follows:

$$y1 = x1 + jx2$$

$$y2 = x1 - jx2$$

To summarize, in the two-channel configuration of FIG. 1, the input signal (RF) is down-converted to IF1 and IF2 by LO1 and LO2, respectively. The frequency of LO1 and LO2 are the same, but their respective phases are 90 degrees apart. After digitally down-converting to the baseband, the desired and image signals (y1 and y2) are digitally separated in accordance with the equations expressed above. In practice, calibration data to digitally maintain the 90-degree phase relation and timing may be applied by the separation module as well. Calibration may be particularly desirable given the two-channel system of the current embodiment.

In the example described above, y1 denotes the desired signal and y2 denotes the image signal. However, in some applications y1 can instead denote the image signal and y2 can instead denote the desired signal. Likewise, in the example given above, the phase of LO1 signal is advanced 90 degrees relative to that of the LO2 signal. However, in some applications the phase of LO2 signal may be advanced 90 degrees relative to that of the LO1 signal.

Figure 2:
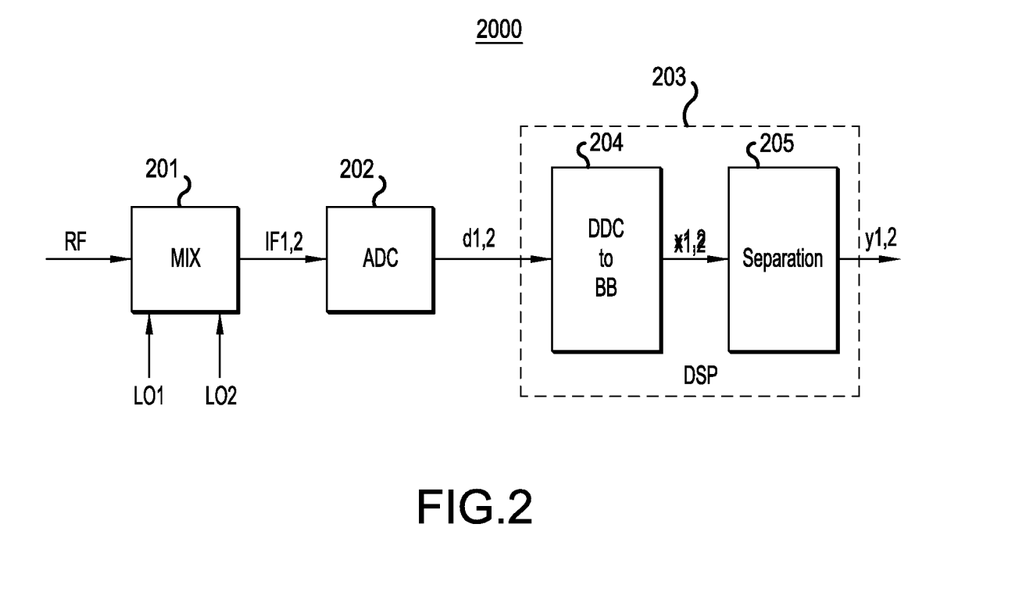
FIG. 2 is a circuit block diagram of an RF receiver according to another embodiment of the inventive concepts.

FIG. 2 is a block circuit diagram of an RF signal receiver according to another embodiment of the inventive concepts.

As shown, the RF signal receiver 2000 of this example is a one-channel configuration. The one-channel configuration is applicable input RF signal is repetitive, such as a 5G NR (Fifth Generation New Radio) signal. Here, the one-channel virtually operates as a two-channel system by two time-interleaved acquisitions of the input RF signal.

Referring to FIG. 2, the RF signal receiver 2000 includes a frequency mixer (MIX) 201, an analog-to-digital converter (ADC) 202, and at least one digital signal processor (DSP) 203. The DSP 203 of this example includes a digital down conversion (DDC) to baseband (BB) module 204 and a separation module 205.

In operation, an input RF signal is applied to the frequency mixer 201. In a first time-interleaved acquisition of the input RF signal, the frequency mixer 201 mixes the input RF signal and a first local oscillator (LO1) signal to down-convert the input RF signal to a first intermediate frequency signal. In a second time-interleaved acquisition of the input RF signal, the frequency mixer 102 mixes the input RF signal and a second local oscillator (LO2) signal to down-convert the input RF signal to a second intermediate frequency signal. In this manner, resultant time-interleaved intermediate frequency signals IF1/IF2 are generated. As with the example of the previous embodiment, a frequency of the LO1 signal is the same as a frequency of the LO2 signal, while a phase of the LO1 signal is spaced apart 90 degrees relative to the phase of the LO2 signal. As one example, the LO1 signal may be a cosine wave (cos( )) and the LO2 signal may be a corresponding negative sine wave (−sin( )) of the same frequency.

The time-interleaved intermediate frequency signals IF1/IF2 are sampled and converted to time-interleaved digital IF signals d1/d2 by the analog-to-digital converter (ADC) 202. Here, the remainder of the operation may take place in the digital domain.

The DDC to BB module 204 of the digital signal processor (DSP) 203 digitally down-converts the time-interleaved digital IF signals d1/d2 to corresponding time-interleaved digital baseband (BB) signals x1/x2. As with the previous embodiment, the digital down-conversion (DCC) processes of the DDC to BB module 204 may be ideally characterized as follows:

$$x1 = \exp(-j2\pi f_{IF} t_n) d1$$

$$x2 = \exp(-j2\pi f_{IF} t_n) d2$$

The separation module 205 of the digital signal processor (DSP) 103 then generates separate time-interleave desired (y1) and image (y2) signals y1/y2 by digitally processing the time-interleave baseband (BB) signals x1/x2. Again, as will the previous embodiment, the separation processes of the separation module 205 may be ideally characterized as follows:

$$y1 = x1 + jx2$$

$$y2 = x1 - jx2$$

As described above, in the one-channel configuration of FIG. 1, the input signal (RF) is down-converted to time interleaved intermediate frequency signals IF1/IF2 by LO1 and LO2, respectively. The frequency of LO1 and LO2 are the same, but their respective phases are 90 degrees apart. After digitally down-converting to the baseband, the desired and image signals (y1 and y2) are digitally separated in accordance with the equations expressed above. In practice, calibration data to digitally maintain the 90-degree phase relation and timing may be applied by the separation module as well. When compared to the previous embodiment of FIG. 1, the phase calibration is simplified by the one-channel configuration of FIG. 2 since the same path is used for the both acquisitions, although an accurate external trigger may be necessary to ensure timing alignment of the interleaved virtual channels.

In the example described above, y1 denotes the desired signal and y2 denotes the image signal. Again, however, in some applications y1 can instead denote the image signal and y2 can instead denote the desired signal. Likewise, in the example given above, the phase of LO1 signal is advanced 90 degrees relative to that of the LO2 signal. However, in some applications the phase of LO2 signal may be advanced 90 degrees relative to that of the LO1 signal.

The embodiment of FIG. 2 was prototyped and evaluated using real signals. The evaluation results are described next with reference to FIGS. 3A through 5B.

Figure 3A:
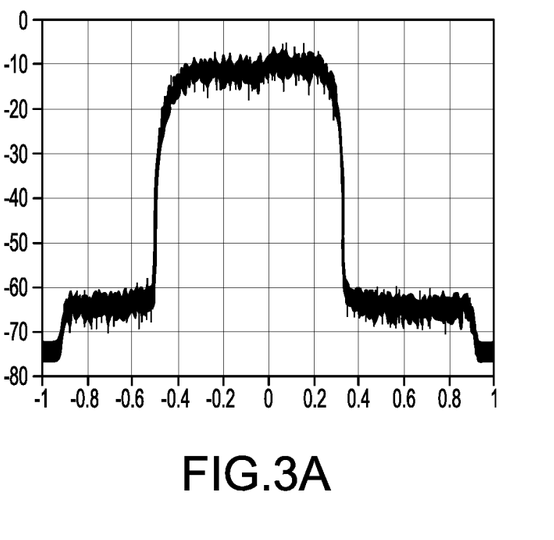
FIGS. 3A, 3B and 3C illustrated measured spectrums of composite, desired and image signals, respectfully.
Figure 3B:
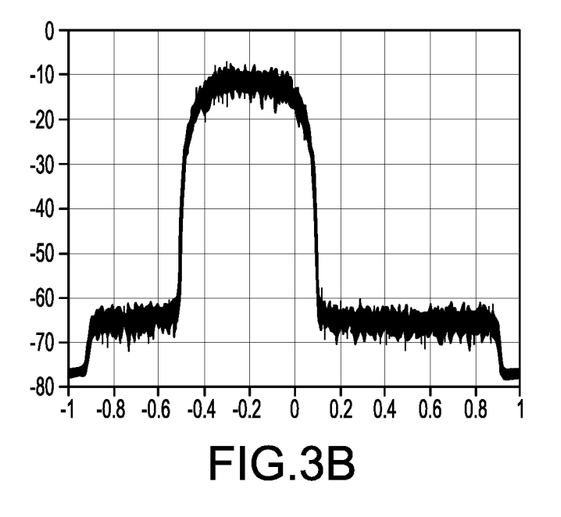
Figure 3C:
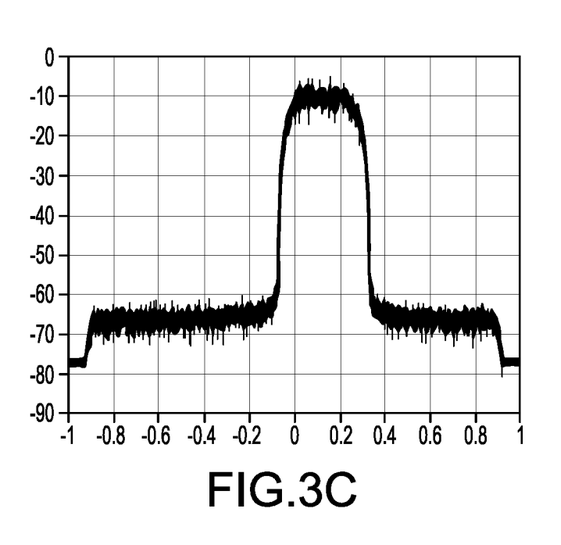

Attention is first directed to FIGS. 3A through 3C. Two signal generators (MXGs) generate the desired and image signals, SG1 and SG2, at different RF frequencies. The measured baseband signals are shown in FIG. 3A through 3C. In FIG. 3A, both SG1 and SG2 are turned on and overlapped in frequency. In FIG. 3B, only the desired signal SG1 is turned on, and in FIG. 3C only the image signal SG2 is turned. Given the mixed signal SG1+SG2, the prototyped embodiment is configured to separate the two to restore the SG1 signal and the SG2 signal as much as possible.

Figure 4A:
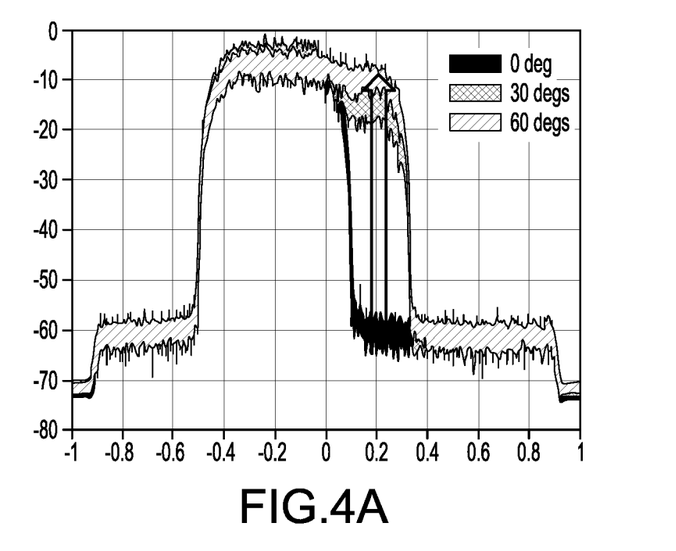
FIGS. 4A and 4B illustrate separation results at different local oscillator (LO) phase shifts.
Figure 4B:
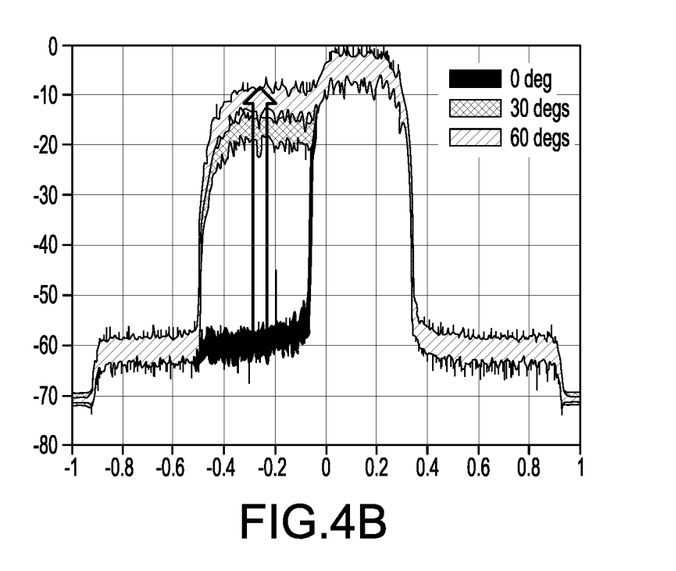

The mixed signal was run though the digital image separation (DIS) process described above, and the separation results are shown in FIGS. 4A and 4B. The case is considered where the 90 degree shift in the LO is not ideal so the calibration can be shown as well. In these figures, when the phase error from 90 degrees is 0 degree, it is observed that the desired and image signals are separated very well. When the phase error is larger (30 or 60 degrees), it is observed that only limited separation can be achieved.

Figure 5A:
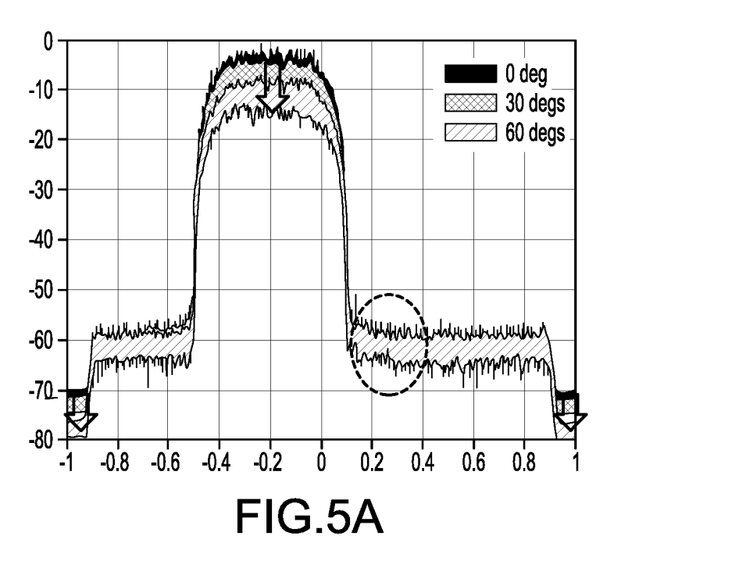
FIGS. 5A and 5B illustrate separation results at different local oscillator (LO) phase shifts after compensation.
Figure 5B:
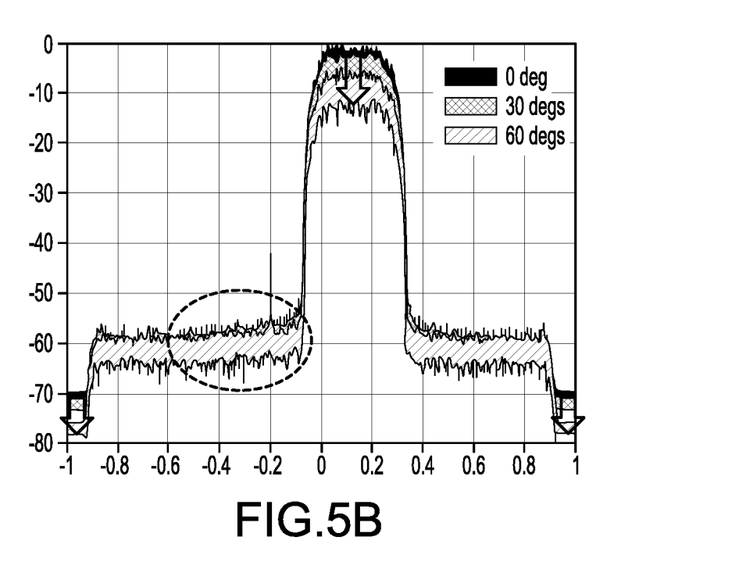

On the other hand, after appropriate compensation is applied digitally, it is shown that the separation can be achieved even when phase error is large. This is shown in FIG. 5A (the desired signal) and 5B (the image signal). From these figures it can be seen that the embodiment with compensation is tolerant to phase error between the two LOs.

Figure 6:
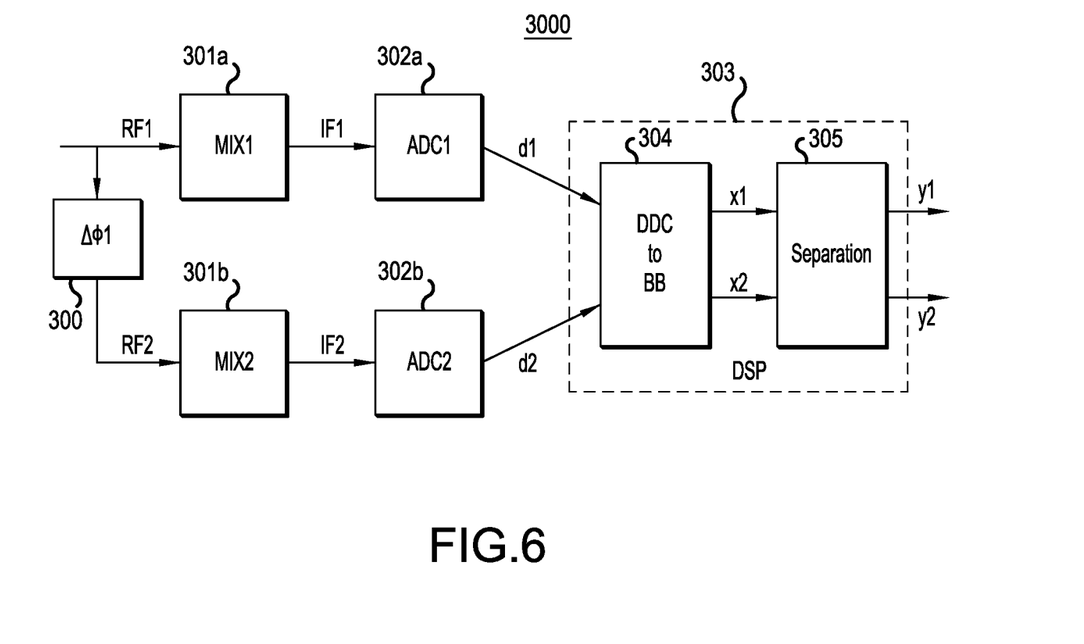
FIG. 6 is a circuit block diagram of an RF receiver according to another embodiment of the inventive concepts.

FIG. 6 is a block circuit diagram of an RF signal receiver according to another embodiment of the inventive concepts.

In the previous embodiments, the phase shift was achieved by the use of two local oscillators (LO1 and LO2) having the same frequency but differing in phase by 90 degrees. FIG. 6 presents an alternative embodiment in which the phase shift is introduced by applying the input RF signal to a phase-shifter 300.

As shown in FIG. 6, the RF signal receiver 3000 of this example is a two-channel configuration including a phase shifter 300, a first frequency mixer (MIX1) 301a, a second frequency mixer (MIX2) 301b, a first analog-to-digital converter (ADC1) 302a, a second analog-to-digital converter (ADC2) 302b, and at least one digital signal processor (DSP) 303. The DSP 303 of this example includes a digital down conversion (DDC) to baseband (BB) module 304 and a separation module 305.

In operation, an input radio frequency (RF) signal RF1 is applied to the phase shifter 300 to generate a phase-shifted RF signal RF2 that differs in phase (Δphi) from the RF signal RF1 by plus-or-minus 90 degrees. The RF signal RF1 is applied to the first frequency mixer 301a, while the phase-shifted RF signal RF2 is applied to the second frequency mixers 301b. The first frequency mixer 301a mixes the input RF signal RF1 and a first local oscillator (LO1) signal to down-convert the input RF signal to a first intermediate frequency (IF1) signal, and the second frequency mixer 301b mixes the phase-shifted RF signal RF2 and a second local oscillator (LO2) signal to down-convert the input RF signal to a second intermediate frequency (IF2) signal. In the example of the current embodiment, a frequency of the LO1 signal is the same as a frequency of the LO2 signal, and a phase of the LO1 signal is the same as a phase of the LO2 signal.

The remainder of the embodiment of FIG. 6 operates in the same or similar manner as that described previously in connection with FIG. 1. That is, the first intermediate frequency (IF1) signal is sampled and converted to a digital IF1 signal d1 by the first analog-to-digital converter (ADC1) 302a. Likewise, the second intermediate frequency (IF2) signal is sampled and converted to a digital IF2 signal d2 by the second analog-to-digital converter (ADC2) 302b. Here, the remainder of the operation may take place in the digital domain.

The DDC to BB module 304 of the digital signal processor (DSP) 303 digitally down-converts the digital IF1 signal d1 to a corresponding digital baseband (BB) signal x1. Further, the DDC to BB module 304 of the digital signal processor (DSP) 303 digitally down-converts the digital IF2 signal d2 to a corresponding digital baseband (BB) signal x2 as described previously in connection with FIG. 1.

The separation module 105 of the digital signal processor (DSP) 303 calibrates the digital baseband signals and generates separate desired (y1) and image (y2) signals by digitally processing the digital baseband signals x1 and x2 as described previously in connection with FIG. 1.

Figure 7:
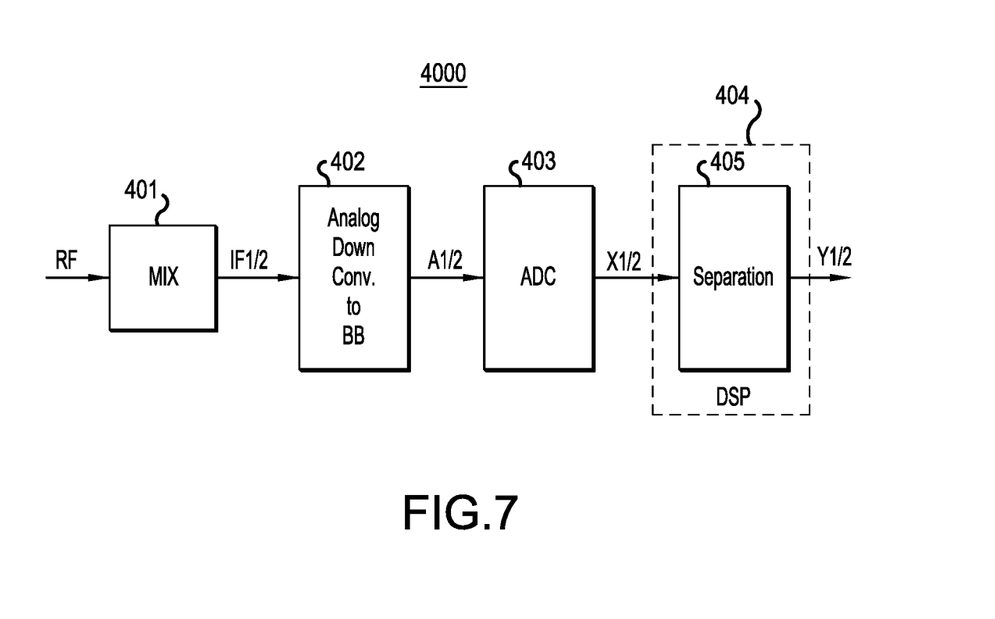
FIG. 7 is a circuit block diagram of an RF receiver according to another embodiment of the inventive concepts.

FIG. 7 is a block circuit diagram of an RF signal receiver according to another embodiment of the inventive concepts.

As described previously, embodiments of the inventive concepts present an image rejection scheme that works in the digital domain. To that end, the previous embodiments utilized one or more digital signal processors (DSP's) to down-convert to the baseband, and to calibrate and separate of the down-converted signals. FIG. 7 presents an alternative in which the down-conversion to baseband is carried out in the analog domain.

As shown in FIG. 7, the RF signal receiver 4000 of this example includes a frequency mixer (MIX) 401, an analog down conversion to baseband (BB) circuit 402, an analog-to-digital converter (ADC) 403, and at least one digital signal processor (DSP) 404. The DSP 404 of this example includes a separation module 405.

In operation, an input RF signal is applied to the frequency mixer 401. In a first time-interleaved acquisition of the input RF signal, the frequency mixer 201 mixes the input RF signal and a first local oscillator (LO1) signal to down-convert the input RF signal to a first intermediate frequency signal. In a second time-interleaved acquisition of the input RF signal, the frequency mixer 102 mixes the input RF signal and a second local oscillator (LO2) signal to down-convert the input RF signal to a second intermediate frequency signal. In this manner, resultant time-interleaved intermediate frequency signals IF1/IF2 are generated. As with previous examples, a frequency of the LO1 signal is the same as a frequency of the LO2 signal, while a phase of the LO1 signal is spaced apart 90 degrees relative to the phase of the LO2 signal. As one example, the LO1 signal may be a cosine wave (cos( )) and the LO2 signal may be a corresponding negative sine wave (−sin( )) of the same frequency.

The time-interleaved intermediate frequency signals IF1/IF2 are down-converted to baseband by the analog down conversion to BB circuit 402. As a result, time-interleaved down-converted analog baseband signals A1/A2 are generated.

The down-converted analog baseband signals A1/A2 sampled and converted to time-interleaved digital baseband signals x1/x2 by the analog-to-digital converter (ADC) 403. Here, the remainder of the operation may take place in the digital domain.

The separation module 405 of the digital signal processor (DSP) 404 then generates separate time-interleaved desired (y1) and image (y2) signals y1/y2 by digitally processing the time-interleave baseband (BB) signals x1/x2 as described previously.

Figure 8:
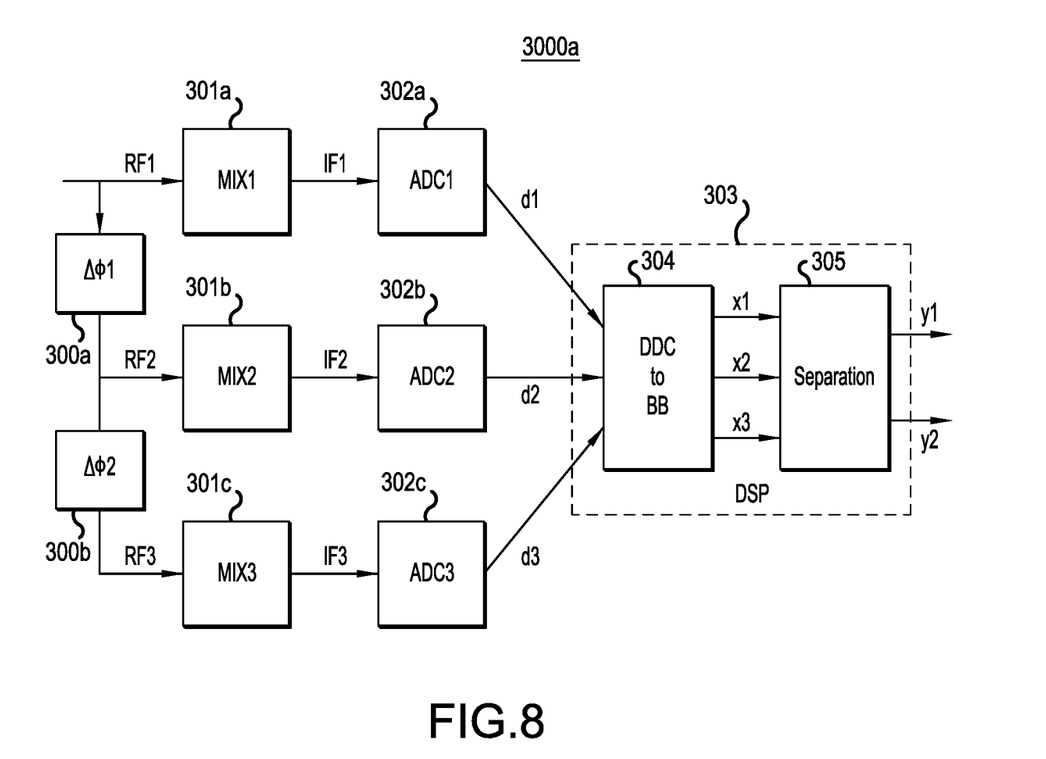
FIG. 8 is a circuit diagram of an RF receiver according to another embodiment of the inventive concepts.

In the embodiments described and illustrated above, examples are presented in which two (2) receiving paths (interleaved or via separate channels) to the digital signal processor (DSP). However, the inventive concepts are not limited in this manner, and instead three or more receiving paths may be provided to the DSP. For example, FIG. 8 illustrates a variation of FIG. 6 in which a three-channel system is implemented including multiple phase shifters 300a and 301b resulting in two phase shifted signals RF2 and RF3. In FIG. 8, the phase shift of phase shifter 300a is designated as Δphi1 and the phase shift of phase shifter 300b is designated as Δphi2 Here, it is noted that the phase shift Δphi1 may be the same as or different than the phase shift Δphi2 Like the two channels of FIG. 6, the third channel includes a mixer (MIX3) 301c outputting a third intermediate signal IF and an analog to digital converter (ADC3) 302c outputting a third digital signal d3. As shown, the first through third digital signals d1, d2 and d3 are down-converted to baseband to obtain baseband signals x1, x2 and x3 which are digitally separated into the desired (y1) and image (y2) signals.

Also in the embodiment described and illustrated above, a single RF signal is processed. Again, however, the inventive concepts are not limited in this manner and instead multiple RF signals can be processed through different paths (or channels). Likewise, multiple IF signals may be processed by different LO phases at the RF. Still further, multiple baseband (BB) signals may be processed by different LO phases at the RF.

As such, while the invention has been illustrated and described in detail in the drawings and foregoing description, such illustration and description are to be considered illustrative or exemplary and not restrictive: the invention is not limited to the disclosed embodiments. Other variations to the disclosed embodiments can be understood and effected by those skilled in the art in practicing the claimed invention, from a study of the drawings, the disclosure, and the appended claims. While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

What is claimed is:

1. A method of frequency-converting a received radio frequency (RF) signal, comprising:
   frequency mixing the received RF signal with a first local oscillator (LO) signal to generate a first intermediate frequency (IF) signal, the first IF signal being a mixed signal of a desired signal and an image signal;
   frequency mixing the RF signal with a second LO signal to generate a second IF signal, the second LO signal have a same frequency as the first LO signal, and the second LO signal having a 90 degree phase shift relative to the first LO signal;
   analog-to-digital converting the first IF signal to a first digital signal and the second IF signal to a second digital signal;
   down-converting the first digital signal to a first digital baseband signal and the second digital signal to a second digital baseband signal; and
   calibrating the first and second digital baseband signals for the 90 degree phase shift, and separating the calibrated first and second digital baseband signals to obtain the desired signal and the image signal.

2. The method of claim 1, wherein the received RF signal is input to a two-channel configuration,
   wherein a first mixer generates the first IF signal and a first analog-to-digital converter (ADC) of a first channel generates a first digital signal, and
   wherein a second mixer generates the second IF signal and second analog to digital (ADC) of a second channel generates the second digital signal.

3. The method of claim 1, wherein the received RF signal is input to a single channel configuration,
   wherein a mixer of the single channel configuration is timeinterleaved to generate the first and the second IF signals and an analog-to-digital converter (ADC) of the single channel configuration is time-interleaved to generate a first and a second digital IF signals.

4. The method of claim 1, wherein the down-converting is characterized by:

$$x1 = \exp(-j2\pi f_{IF} t_n) d1$$

$$x2 = \exp(-j2\pi f_{IF} t_n) d2$$

where x1 denotes the first baseband signal, x2 denotes the second baseband signal, d1 denotes the first digital signal, d2 denotes the second digital signal, $f_{IF}$ denotes the frequency of the first and second IF signals, and $t_n$ denotes a time interval.

5. The method of claim 4, wherein the separating is characterized by:

$$y1 = x1 + jx2$$

$$y2 = x1 - jx2$$

where y1 is the one of the desired signal and the image signal, and y2 denotes the other of the desired signal and the image signal.

6. A radio frequency (RF) signal receiver, comprising:
   a first mixer configured to mix a radio frequency (RF) signal and a first local oscillator (LO) signal to generate a first intermediate frequency (IF) signal, the first IF signal being a mixed signal of a desired signal and an image signal;
   a second mixer configured to mix the radio frequency (RF) signal and a second local oscillator (LO) signal to generate a second intermediate frequency (IF) signal, the second LO signal have a same frequency as the first LO signal, and the second LO signal having a 90 degree phase shift relative to the first LO signal;
   a first analog-to-digital converter (ADC) configured to convert the first IF signal to a first digital signal;
   a second analog-to-digital converter (ADC) configured to convert the second IF signal to a second digital signal; and
   a digital signal processor (DSP) configured to down-convert the first digital signal to a first digital baseband signal and the second digital signal to a second digital baseband signal, to calibrate the first and second digital baseband signals for the 90 degree phase shift, and to separate the first and second baseband signals to obtain the desired signal and the image signal.

7. The RF signal receiver of claim 6, wherein the down-converting is characterized by:

$$x1 = \exp(-j2\pi f_{IF} t_n) d1$$

$$x2 = \exp(-j2\pi f_{IF} t_n) d2$$

where x1 denotes the first baseband signal, x2 denotes the second baseband signal, d1 denotes the first digital signal, d2 denotes the second digital signal, $f_{IF}$ denotes the frequency of the first and second IF signals, and $t_n$ denotes a time interval.

8. The RF signal receiver of claim 7, wherein the separating is characterized by:

$$y1 = x1 + jx2$$

$$y2 = x1 - jx2$$

where y1 is the one of the desired signal and the image signal, and y2 denotes the other of the desired signal and the image signal.

9. A radio frequency (RF) signal receiver, comprising:
   a mixer configured during a first time-interleaved interval to mix a radio frequency (RF) signal and a first local oscillator (LO) signal to generate a first time-interleaved intermediate frequency (IF) signal, the first time-interleaved IF signal being a mixed signal of a desired signal and an image signal;

the mixer further configured during a second time interleave interval to mix the RF signal and a second local LO signal to generate a second time-interleaved intermediate frequency (IF) signal, the second LO signal have a same frequency as the first LO signal, and the second LO signal having a 90 degree phase shift relative to the first LO signal;

an analog-to-digital converter (ADC) configured to convert the first time-interleaved IF signal to a first time-interleaved digital signal, to convert the second time-interleaved IF signal to a second time-interleaved digital signal; and a digital signal processor (DSP) configured to down-convert the first time-interleaved digital signal to a first time-interleaved baseband signal and the second time-interleaved digital signal to a second time-interleaved baseband signal, to calibrate the first and second time-interleaved digital baseband signals for the 90 degree phase shift, and to separate the calibrated first and second time-interleaved baseband signals to obtain the desired signal and image signals.

10. The RF signal receiver of claim 9, wherein the down-converting is characterized by:

$$x1 = \exp(-j2\pi f_{IF} t_n) d1$$

$$x2 = \exp(-j2\pi f_{IF} t_n) d2$$

where x1 denotes the first time-interleaved baseband signal, x2 denotes the second time-interleaved baseband signal, d1 denotes the first digital signal, d2 denotes the second digital signal, $f_{IF}$ denotes the frequency of the first and second time-interleaved IF signals, and $t_n$ denotes a time interval.

11. The RF signal receiver of claim 10, wherein the separating is characterized by:

$$y1 = x1 + jx2$$

$$y2 = x1 - jx2$$

where y1 is the one of the desired signal and the image signal, and y2 denotes the other of the desired signal and the image signal.

* * * * *